Figure 1:
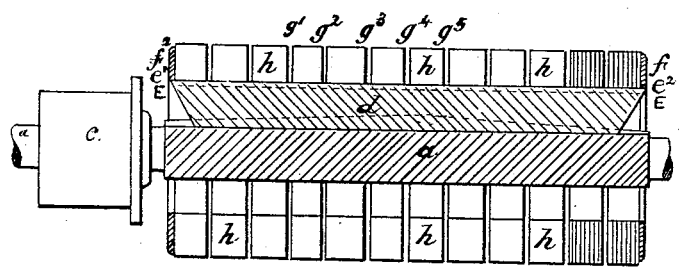

(No Model.)

R. E. B. CROMPTON.
DYNAMO ELECTRIC MACHINE AND ELECTRIC MOTOR.

No. 387,343.          Patented Aug. 7, 1888.

FIG. 5ª

Witnesses:
Will T Norton.
Walter Allen.

Inventor:
R. E. B. Crompton.
by his Attys. John J. Halsted & Son.

N. PETERS, Photo-Lithographer, Washington, D. C.

United States Patent Office.

ROOKES EVELYN BELL CROMPTON, OF LONDON, ENGLAND.

DYNAMO-ELECTRIC MACHINE AND ELECTRIC MOTOR.

SPECIFICATION forming part of Letters Patent No. 387,343, dated August 7, 1888.

Application filed February 23, 1887. Serial No. 228,517. (No model.) Patented in England March 3, 1884, No. 4,302, and in Belgium February 19, 1885, No. 67,928.

*To all whom it may concern:*

Be it known that I, ROOKES EVELYN BELL CROMPTON, a subject of the Queen of Great Britain and Ireland, residing at Mansion House Buildings, Queen Victoria Street, in the city of London, England, have invented certain new and useful Improvements in Dynamo-Electric Machines, (patented in Great Britain March 3, 1884, No. 4,302, and in Belgium February 19, 1885, No. 67,928,) of which the following is a specification.

My improvements in dynamo-electric machines relate more particularly to those machines in which the rotating armature is of ring form, although some portions of the invention may be adapted to the armatures of dynamo-electric machines of other form.

The objects of my invention are, first, the better communication of the driving strain from the driving spindle or axle to the armature core and coils or winding; second, the obtaining an intense magnetic field of force through which the armature coils or winding moves, and hence obtaining high electro-motive force with comparatively few turns of winding and slow surface speed of the armature by so proportioning and arranging the iron composing the armature-core and the copper conductor forming the winding that the radial depth of this iron core may be as great as possible; third, the arranging of the winding and its insulation so as to allow of the free access of a ventilating-current of air to every part of its surface, and the providing this ventilating-current by simple means; fourth, the simplification of the winding, so that every part of it is readily accessible for examination, repair, or renewal.

My improved armature consists of an iron ring-core formed, preferably, of a large number of separate rings or washers stamped out of soft annealed sheet-iron. These washers are mounted, in the manner hereinafter to be described, on longitudinal spokes or radial bars made of non-magnetizable metal and held in such a manner that the central hub carrying these radial bars can be withdrawn, leaving the radial bars on which are mounted the washers, attached firmly to the latter. This withdrawal of the central hub or hubs (as the case may be) greatly facilitates the winding of the armature-coils onto the core. It also facilitates the insulation of the wires, and afterward permits of easier access to the internal surface of the ring-core than has hitherto been the case, and thus lessens the cost of repair or renewals of the coils. In carrying this out I stamp or otherwise cut out dovetail-shaped notches in the inner edge of each of the washers. These notches all being cut by the same stamping-press (or other tool) must be exactly alike. The radial bars have corresponding dovetail projections cut at their outward ends or edges, (as the case may be.) The inner edges of the radial bars may be of any suitable form, and in turn are carried by notches or grooves cut in the external surface of the central hubs, hub, or axle.

Figure 2:
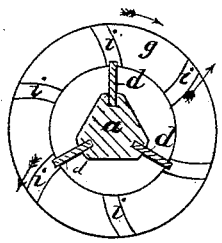
Figure 3:
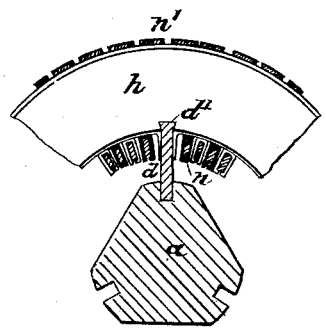
Figure 4:
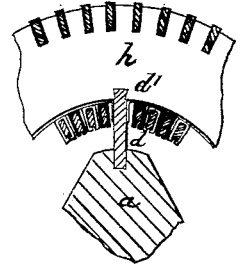
Figure 5:
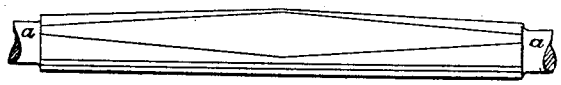
Figure 5:
Figure 6:
Figure 7:
Figure 8:
Figure 9:
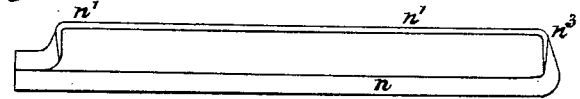
Figure 10:
Figure 11:
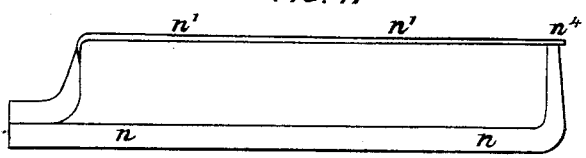
Figure 12:

Figures 1 to 5ª show this mounting of the core. Fig. 1 shows a longitudinal section through the spindle hubs, radial bars, and core. Fig. 2 shows a sectional end view through a plain ring or Gramme form of core. Fig. 3 shows a sectional end view through a portion of the same, to a larger scale, and shows a portion of the winding in position. Fig. 4 shows a sectional end view through an indented ring or "Pacinotti" form of core, with portion of the winding in position. Figs. 5 and 5ª show the form of spindle in plan and in end view. Fig. 6 shows an edge view of a piece of insulating material with which I sometimes line the arc-shaped spaces between the radial bars. This may be used with small armatures. Fig. 7 shows insulators made of short lengths of tube (such as is shown in Fig. 8) slipped onto the coils or bars in alternate order. This may be used with larger armatures. Fig. 9 shows a manner of twisting the copper winding-strips; Fig. 10, an end view of the same; Figs. 11 and 12, side and end views of another form of the strips.

In Figs. 1, 2, 3, and 4, $a\ a$ is the spindle; $c$, the commutator; $d\ d$, the radial bars; $d'$, the dovetail-shaped projections fitting into the corresponding notches in the core-rings.

$h\ h\ h$, Figs. 2, 3, and 4, show clearly the mode in which the inner edges of the radial bars $d\ d$ are carried by the grooves or keyways in the spindle $a$.

Fig. 4 shows the form of the spindle, and Fig. 4ª an end view of the same, the central portion of the spindle being enlarged or swelled out, so as to form one long hub.

I have shown in the drawings three radial bars only, which for the smaller-sized armatures is a convenient number; but in the larger armatures I employ any convenient number of radial bars, and the transverse section of the hubs will be modified to suit this increased number of bars.

To mount the armature-core in the first instance, the radial bars $d$ $d$ are first placed in order in their grooves and then one end washer, $f$, made thicker than the others, is slid over the bars, the dovetail notches sliding down the corresponding projections, $d'$ $d'$. This first washer, $f$, is prevented from sliding right over the ends of the radial bars by their being slightly upset or riveted over at $e$, the notches in the washer $f$ being made larger at the outer side than at the inner one, as shown by the sloping lines at $e^2$. The remainder of the washers are then slid on in order, being insulated from one another by asbestos paper or by coating them with a suitable insulating material. At regular intervals, as shown at $g'$ $g^2$ $g^3$ $g^4$ $g^5$, &c., the washers may be spaced from one another by strips of material $i$ $i$, which must also insulate them from one another and thus leave radial ventilating channels or spaces. After all the washers have been put on so as to form a core of the required length the last washer put on must be a thick one made similar to the first one, $f$. This is shown at $f^2$. The ends of the radial bars are then riveted down onto the last washer, $f^2$, as shown at $e'$. The spindle $a$ can now be withdrawn, and the core will be left, having the radial bars firmly attached to it as radial strips projecting inward from its inner surface, but in no way interfering with the process of winding on the coils, to be hereinafter described. Although I have shown that this object can be obtained my making the outward edges of the radial bars and the corresponding notches in the washers of dovetail form, yet I do not confine myself to this precise method of attaching the bars to the core-washers.

The object in all cases is that when the central hub is withdrawn the radial bars will still be held so firmly attached to the core-washers that the core as a whole can be readily handled when passing through the ordinary workshop process without fear of its being distorted or losing its correct form.

The insulation of the external periphery of the plain ring-core (shown in Fig. 3) may be carried out in any convenient manner by winding tape or other insulating material onto it, so as not to interfere with the openings or channels $g'$ $g^2$ $g^3$ $g^4$, &c.

The insulation of the indented ring-armature (shown in Fig. 4) may be carried out by trough-shaped linings of insulating material being inserted in each notch or indentations of the periphery of the core. The projections of the core between the notches may be left bare; but the insulation of the inner cylindrical surface of the core requires that special provision should be made not only to prevent the channels $g'$ $g^2$, &c., being stopped at their inner edges, but also to provide spaces for the air to circulate between the copper wires or strips forming the winding.

It will be seen from Figs. 1, 2, 3, and 4 that I form my core of far greater depth measured radially than has been heretofore the case. I do this for magnetic reasons in order to approximate more nearly the area of cross-section of the iron forming the core of the armature coils or winding to that of the iron forming the core of the field-magnet coils; but this increased radial depth introduces considerable difficulty in the winding of the armature.

In the proportion of core shown on the drawings it will be seen from Fig. 3 that each turn of the winding occupies at $n'$, on the outer periphery, nearly twice the width measured tangentially that it does at $n$ on the inner periphery. To provide for this in one arrangement, (shown in end section at Fig. 3 and by side view of one turn of the winding at Fig. 9,) I make the coil of copper strip of rectangular section, as shown, and pass it through the inner space on its edge—that is to say, with its larger diameter placed radially, as shown at $n$—and twist it through a quarter-turn at $n^3$, Fig. 9, so that it passes back on the outer periphery of the core with its larger diameter placed tangentially or flatwise.

In the case of large bars I use copper of varying sections, as may be found most convenient for the inner part of the winding, and either braze or autogeneously solder it to copper of any convenient sections to form the outer winding. This is shown at $n^4$, Figs. 11 and 12. By these arrangements I can reduce the total thickness of the external part of winding measured radially far below what has been hitherto attempted, and I thus obtain the result that whether I use the plain or indented form of ring-core in the revolution of the armature the surface of its core passes very close to the polar surfaces of the field-magnet cores. The winding therefore passes through a very intense magnetic field. The heavy sections of core and the intense magnetic field which this winding admits of renders it possible to obtain electro-motive force high enough for most commercial purposes with a comparatively small number of turns on the armature—$i.$ $e.$, the winding will consist of one only, two, or at most three turns of winding to each section of the commutator. It follows that all the winding being formed of separate stirrups or loops of copper, as before described, all the soldered joints or connections connecting these loops together and to the commutator may be formed at the commutator end of the armature, and that any of the loops can be easily disconnected and drawn off from the core for purposes of repair. It will be seen that for purposes of convenient manufacture my invention admits of the preparation, spacing, and insulation of the copper loops in groups, which may consist in any number of the loops, preferably of such number as will fill the space between two adjoining radial bars. Such preparation and grouping may be carried out on a model or former apart from the armature-core, and the whole may be passed into place on the core as a complete group or section of winding, and this group can afterward be removed as a whole for purposes of examination or repair.

I claim—

1. In an armature for a dynamo-electric machine, the combination, with a removable axle, of radial bars $d$ and wrought-iron disks held by such bars, substantially as and for the purpose set forth.

2. In an armature for a dynamo-electric machine, the combination, with iron disks having dovetailed notches, of radial bars having dovetailed edges to fit said notches, all substantially as set forth.

3. In an armature for a dynamo-electric machine, the combination of a detachable spindle with radial bars and iron disks arranged with spacing-pieces and radial ventilating-passages, substantially as set forth.

4. In an armature for a dynamo-electric machine, the winding consisting of loops or stirrups of copper strip arranged so as to lie flat on the outside of the armature and so as to be on edge on the inside, substantially as shown and described.

In testimony whereof I have hereunto set my hand in the presence of two subscribing witnesses.

ROOKES EVELYN BELL CROMPTON.

Witnesses:
 GEO. J. B. FRANKLIN,
 W. J. NORWOOD.